UNITED STATES PATENT OFFICE.

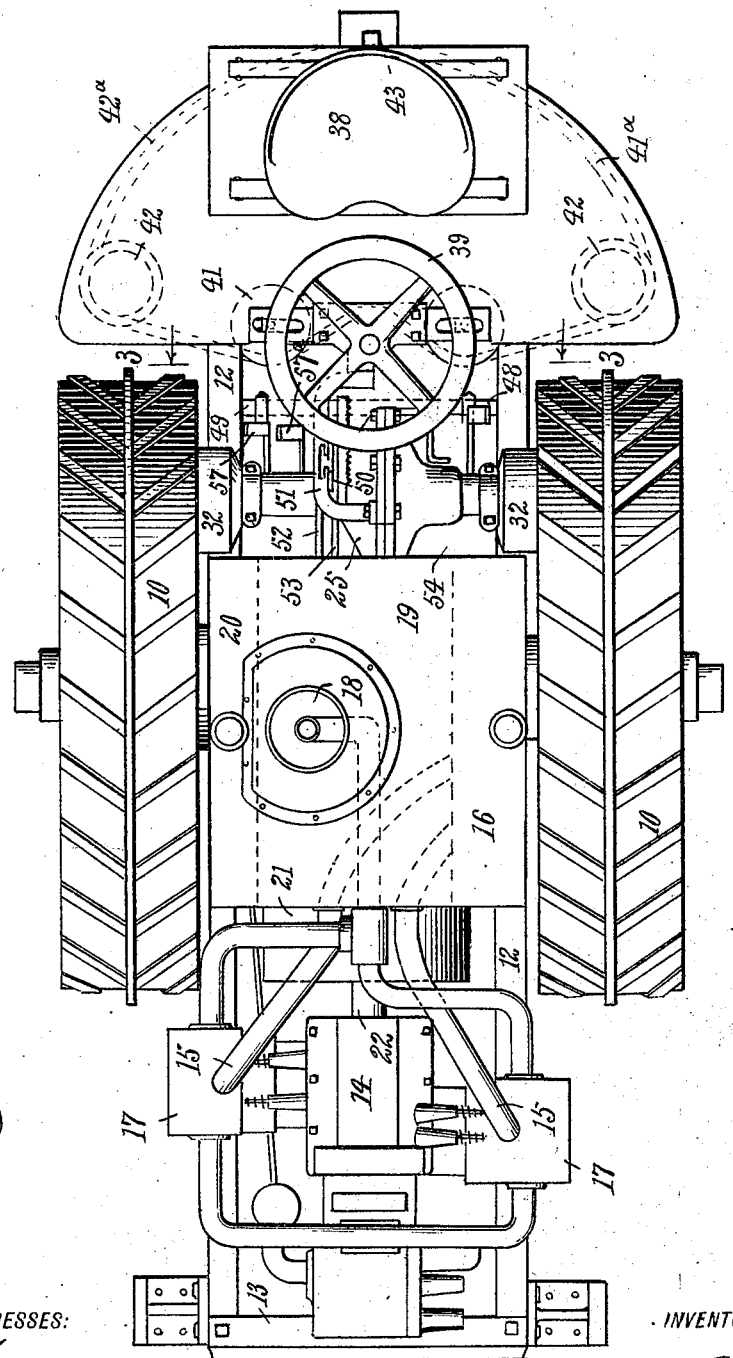

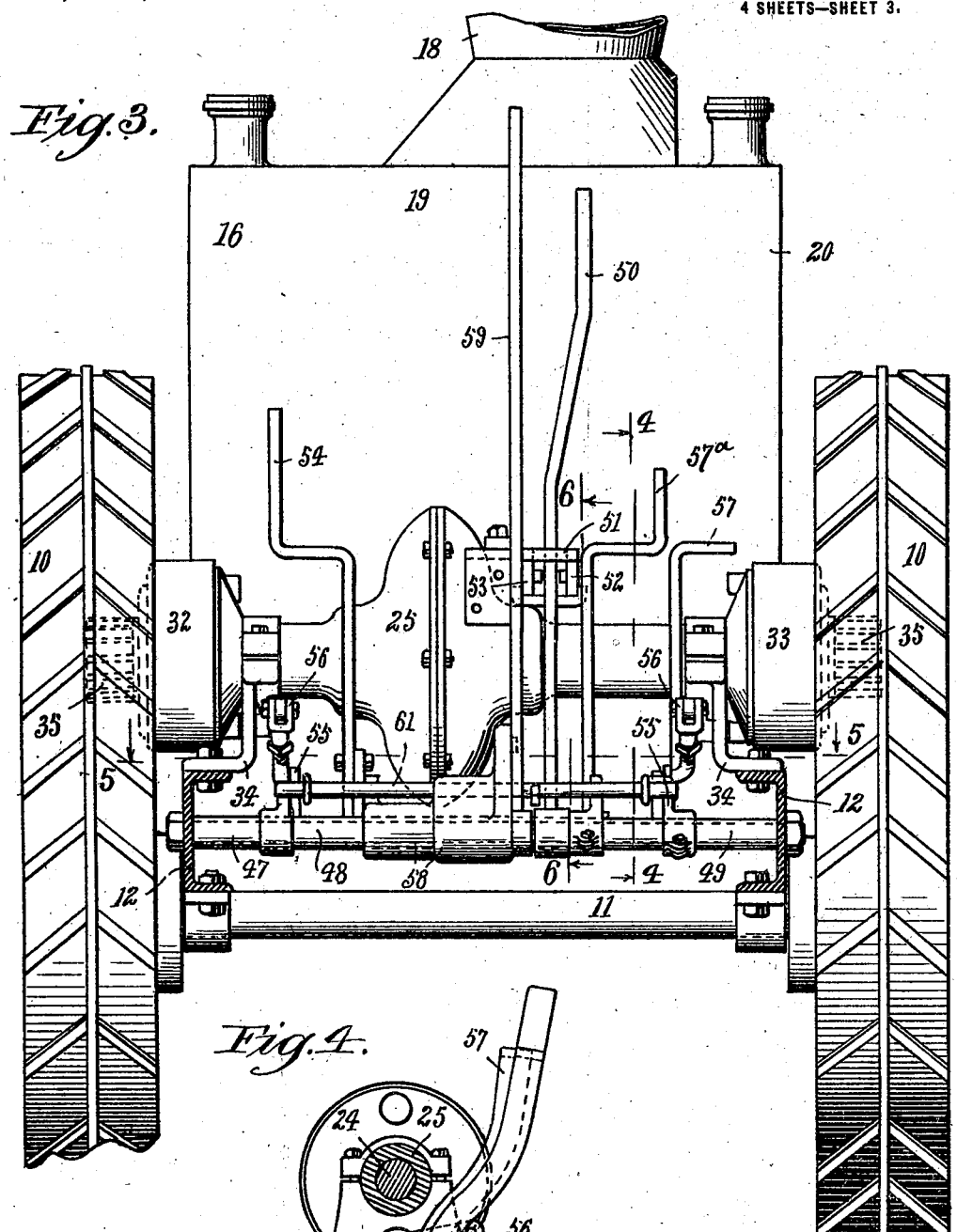

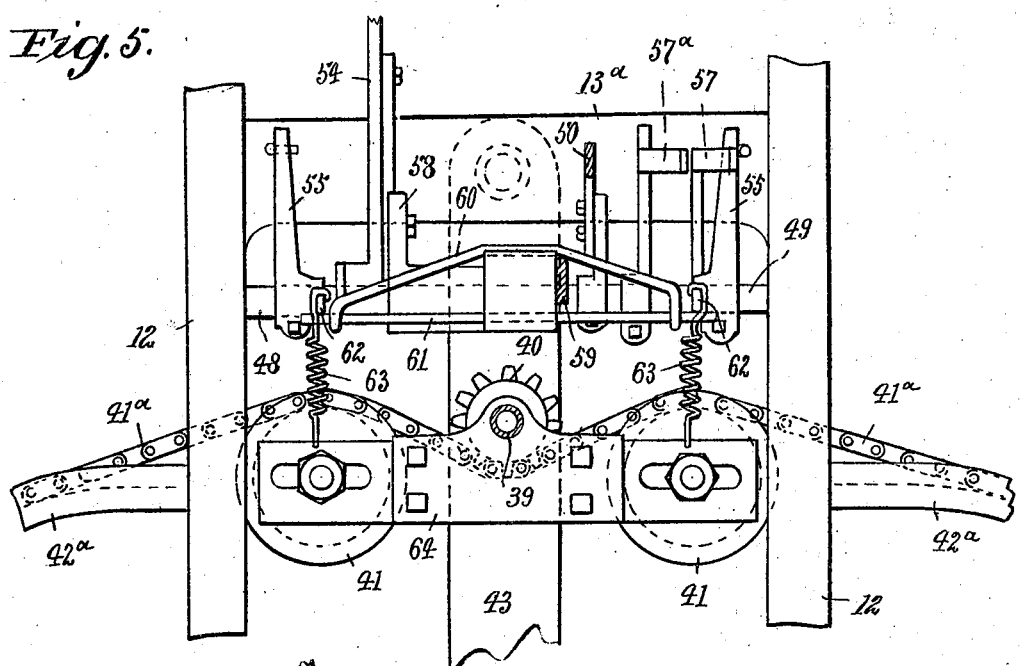
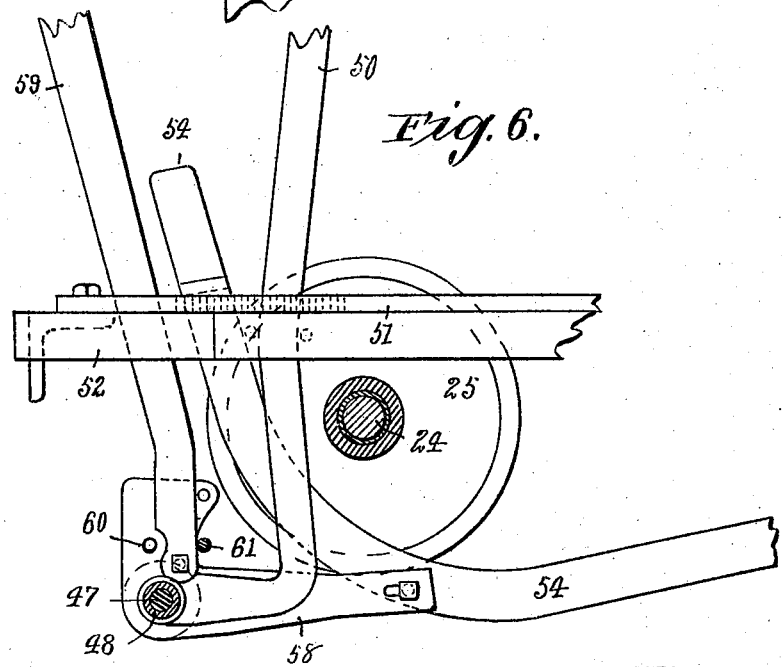

HENRY J. STEGEMAN, OF BRIDGEPORT, CONNECTICUT, ASSIGNOR OF ONE-HALF TO WILLIAM J. PERRY, OF BRIDGEPORT, CONNECTICUT.

TWO-WHEEL TRACTOR.

1,188,696.  Specification of Letters Patent.  Patented June 27, 1916.

Application filed December 27, 1912. Serial No. 738,821.

*To all whom it may concern:*

Be it known that I, HENRY J. STEGEMAN, citizen of the United States, and resident of Bridgeport, in the county of Fairfield and State of Connecticut, have invented certain new and useful Improvements in Two-Wheel Tractors, of which the following is a specification.

My invention relates to a two wheel tractor, and is designed to draw agricultural implements, such as plows, wagons, harrows, harvesters or other forms of field or road machines having a tongue or beam for attachment thereto.

The object of the invention is to improve upon that type of tractor shown and described in my prior patent application filed September 20, 1911, #650,355; and particularly to provide improved steering or guiding means for a tractor of that class and whereby it may be more easily operated; to design the device so that the power of the motor of the tractor may be utilized to effect the steering of the same and thereby relieve the operator of much manual labor; and finally to arrange the said power steering means so that the same may be also used as a brake.

The invention consists in the construction and novel combination and arrangement of parts hereinafter fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Figure 7:
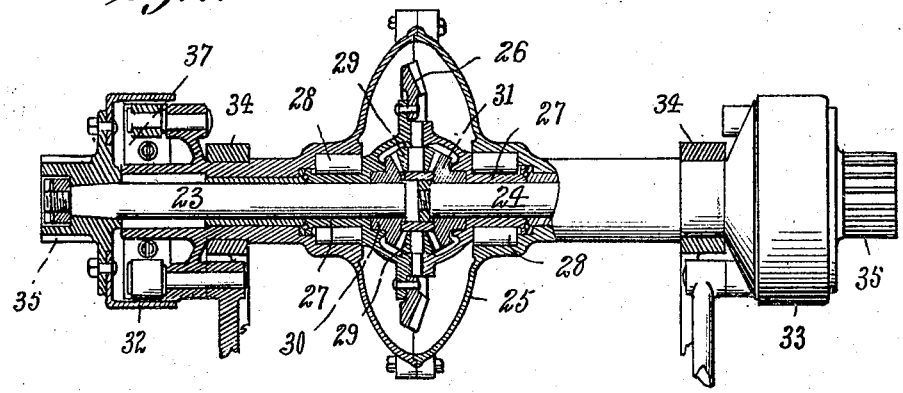
Figure 2:
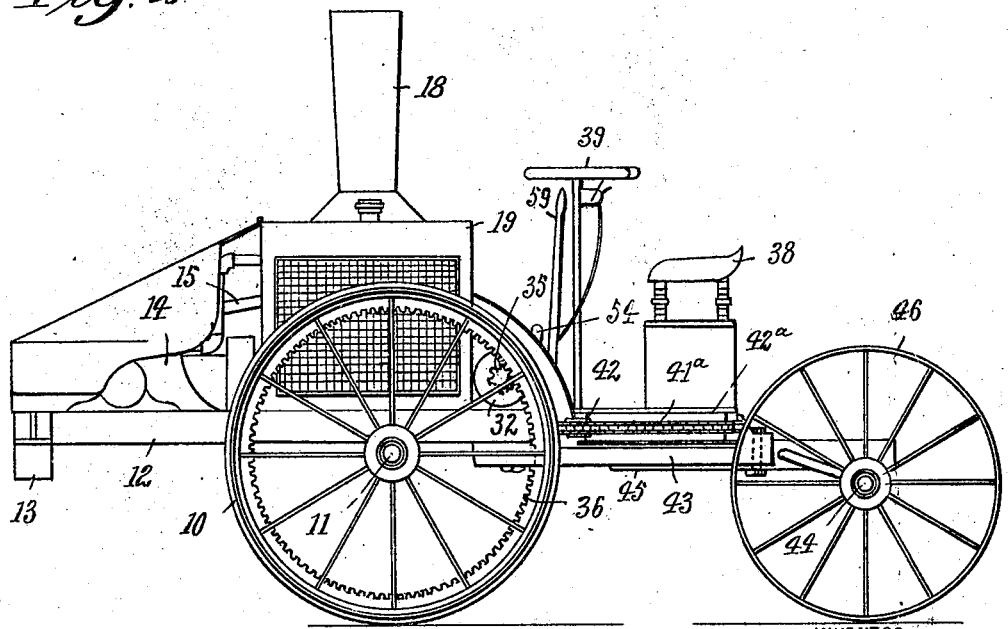

Similar characters of reference denote like or corresponding parts throughout the several figures of the accompanying four sheets of drawings forming a part of this specification, and upon which, Figure 1, is a top plan view of the tractor complete. Fig. 2, shows a side elevation of my improved tractor upon a somewhat reduced scale connected to a supporting cart. Fig. 3, is an enlarged cross sectional elevation taken on line 3—3 of Fig. 1. Fig. 4, is a detail cross sectional view taken on line 4—4 of Fig. 3. Fig. 5, shows a detail plan view of lever and steering mechanism located beneath the steering wheel. Fig. 6, is a detail cross section of operating shaft and lever taken on line 6—6 of Fig. 3. Fig. 7, is a detached sectional elevation of transmission gearing, shafts and clutches.

As will be noted from the drawings my improved tractor is provided with but two wheels that are arranged side by side and both of which constitute driving wheels and serve to support the tractor and draw it and its attached load. A gasolene motor is employed as the operating medium for the tractor and it is arranged upon the forward end of the frame of the machine, while the steering mechanism and driver's seat is located upon the rear end of the frame so that the entire load is about equally divided forward and aft of the axle to which the supporting wheels are attached.

As designed the machine is only operatable when attached to a vehicle or implement which thus serves as a third supporting means in addition to the said tractor wheels. The implement or vehicle to be drawn is attached to a draw bar pivotally connected to the frame and to the rear of the main axle and is obviously designed to be drawn behind and in close proximity to the tractor itself. This enables an operator to make very short turns with the connected devices which is particularly desirable when attached to a plow or harrow and when in the act of cultivating a vineyard or other closely planted rows of plants.

Referring in detail to the characters of reference marked upon the drawings 10 represents the two large tractor wheels which are loosely mounted to turn upon a shaft 11 secured to the under side of the side members 12—12 of the frame. These two steel beams 12 of the frame extend longitudinally forward and aft of the axle and together with the end pieces 13 constitute the frame of the machine.

14 represents the gasolene motor which is mounted upon the forward end of the said frame and is provided with the usual fuel, water and exhaust pipe connections. Of these pipes 15 represents the two pipes that connect the water tank 16 with the water jackets of the cylinders and 17 an exhaust that discharges into a stack 18 supported upon a housing 19 covering both the said water tank 16 and a gas supply tank 20. The motor is provided with a fly wheel 21 and a rearwardly extended shaft 22 that is connected with the driving shafts 23 and 24 through the medium of a differential gearing contained within a casing 25. This gearing comprises a large beveled gear 26 that is driven by a smaller bevel gear (not shown) but mounted upon the said driving shaft 22. This large gear has a hollow hub portion that incloses other gears to be described, and is provided with two sleeves 27 that turn upon the two driving shafts 23 and 24. Roller bearings 28 are operatively mounted between the said sleeves and the extended portions of the casing 25. A pair of small pinions 29 are loosely mounted upon studs carried in the large gear 26 and mesh with and drive two other beveled gears 30 and 31 mounted upon the said shafts 23 and 24 respectively, so that the said shafts may be driven together or separately according to whether or not the brake drums 32 and 33 mounted thereon are clutched.

The casing 25 is supported upon brackets 34 secured to the before mentioned parallel side beams 12 of the frame in a manner to insure the proper positioning of the outer ends of the said shafts within the rim of the tractor wheel and so that the spur gears 35 operated through said shafts will engage and drive the internal gear 36 secured to the inside of the said tractor wheels. The spur gears 35 are secured upon the outer ends of the two shafts 23 and 24 and the brake drums 32 and 33. The operation of the said shafts 26 and 27 is normally direct to the said pinions and gears though the shafts may be shifted or stopped by the intervention of either of two clutch members 37 loosely mounted on the shafts and designed to engage the said drums 32 and 33 connected with the hub of the pinions 35. The clutch members 37 may be made to operate independently in the said drums 32 and 33 with a view of checking the movement of one tractor wheel only by pressure on the footpedals 57 or 57ª and thereby forcing the other wheel to travel around it in a way to effect the turning of the machine through the power imparted from the motor and by the turning of the steering wheel.

Upon the rear of the frame is mounted a platform that supports a seat 38 for the operator and directly in front of the seat is a steering wheel 39 carried by a vertically disposed shaft having a sprocket wheel 40 mounted upon its lower end portion. A sprocket chain 41ª engages this wheel and extends outward over idler rollers 41—41 and 42—42 and is further guided in an arcuate guideway 42ª beneath the edge portion of the platform and has its two ends attached to a draw bar 43 that is pivotally connected to a cross piece 13ª and a pivotal point is arranged to the rear of the axle of the tractor so as to permit the machine to make very short turns.

The implement to be drawn, as for instance that shown in Fig. 2, is detachably connected to the draw bar 43 and thus forms a third support for the machine and makes it an operatable two wheel tractor. As before stated it may be a wagon, plow, harrow or similar machine. The tractor is adapted to be used in connection with most any form of farm implement and for convenience in handling I may use a simple form of two wheel cart, like that shown in Fig. 2, and which includes an axle 44, tongue 45 and wheels 46. This cart like other vehicles to be drawn is detachably connected to the draw bar 43 and thus made to follow behind and support the rear portion of the machine. By the turning of the steering wheel to the right or to the left the sprocket chain 41ª is correspondingly drawn in a way to tend to pull the draw bar and its connected support to the right or left as desired, thus getting the draw bar and support out of alinement with the wheels of the tractor which when the machine is in operation are readily directed to the right or left as the case may be. In addition to the said steering means I provide mechanism which may be simultaneously operated by the same operator and whereby the power of the tractor motor may be applied to only one of the wheels while the other is held stationary or retarded by means of a brake leaving the other free to move around it. These devices for the stopping of the wheels may also be operated simultaneously to serve as a brake for both of the wheels when the motor is disengaged as will be apparent from the description to follow.

A supporting rod 47 extends across through the frame of the tractor and has its two ends secured to the opposite side beams 12 of the frame and serves as a bearing for the hollow rocker shafts 48 and 49 mounted thereon and between the two said side members of the frame. Four operating levers are mounted upon the longer one 48 of these hollow rocker shafts. Some of these levers are loosely mounted upon the shaft 48 and others are secured thereto as will later be explained. These levers include a lever 50 that is loosely mounted upon the said rocker shaft and extends up through an H slot formed in a suitable bracket 51 and serves to operate either of two slides 52 and 53 and which in turn are connected with a power transmission, not shown, for the purpose of operating the same. A clutch lever 54 is also arranged in close proximity to the driver's seat and has its forwardly extended portion connected with a clutch, not shown, for connecting and disconnecting the engine and transmission in the usual manner.

Upon the outer end portion of the shaft 48 is secured an arm 55 that is connected by a link 56 with an arm of the expandable clutch device heretofore referred to and contained within the brake drum 32 previously mentioned. A foot lever 57ª on the inner end of the shaft serves to operate the left brake 32. A foot lever 57 is secured upon the second hollow shaft 49 as will be seen for the independent operation of that shaft and its arm 55 and right hand brake 33. An arm 58 is loosely secured upon the rocker shaft 48 and has its outer end portion operatively connected with the clutch lever 54 so as to also be affected by the operation of said clutch lever, and to put on the brake when clutch is thrown out. A brake lever 59 is pivoted to the short end of this arm 58 and is supported in a vertical position adjacent to the driver's seat, and is used when desired for the simultaneous operation of both brakes. This lever 58 extends upward between two cross rods 60 and 61 forming the forward and rear members of a truss that is arranged above and longitudinal of the rocker shaft and has its two end portions in engagement with lugs 62 on the arms 55 so that a forward movement of the said brake lever will engage the forward rod 60 of the truss in a way to move the same forward and likewise the lugs and arm 55. Springs 63 arranged intermediate of the lugs 62 and the cross bar 64 of the frame serves to normally hold the said truss frame and levers engaged thereby in a normal rearward position so that the operation of any of the said levers in a forward direction would be against the action of the said springs. As will be seen the brake lever 59 is susceptible of a slight independent movement of the arm 58, existing by reason of the space between the said lever 59 and the rods 60 and 61 of the truss thereby permitting of an independent movement of the clutch lever 54 whereby the clutch may be manipulated without affecting the brake. On the other hand, it serves to insure the operation of the said clutch lever and a disengagement of the clutch at such times as when the brake lever is thrust forward to effect the engagement of the brakes and the stopping of the movement of the machine.

The arrangement of the foregoing construction is so convenient and effective that the brakes serve not alone as means to assist in steering the machine, but also in stopping it while under way, both features of which are very necessary to the convenient and practicable operation of a two wheel tractor and thus constitutes an important feature in this class of devices.

Having thus described my invention what I claim and desire to secure by Letters Patent is:—

1. A two wheel tractor of the class described, the same comprising a frame, a pair of driving wheels, an engine and transmission for operating the machine, a pair of driving shafts, a differential gearing connecting the two shafts, a friction clutch connection between the respective driving shafts and driving wheels, means for operating the respective clutches to effect a stoppage of either wheel as desired, means for simultaneously operating both clutches to stop both wheels and a lever connected with said stopping means for disconnecting the engine and transmission.

2. In a two wheel tractor of the class described, the combination with a frame, a pair of driving wheels for supporting the frame and tractor, a pair of driving shafts, a gear and friction clutch on each of the respective driving shafts, a supporting rod, rocker shafts mounted thereon, a lever mounted on each rocker shaft for operating each clutch, means for operating both the said shafts and clutches to effect a stoppage of both wheels.

3. In a two wheel tractor of the class described, the combination with a frame, a pair of driving wheels for supporting the frame and tractor, a pair of driving shafts, a gear and friction clutch on each of the respective driving shafts, a supporting rod, rocker shafts mounted thereon, a lever mounted on each rocker shaft for operating each clutch, a draw bar pivotally connected to the rear part of the frame for connection to a vehicle to be drawn, hand steering mechanism for operating the draw bar to effect a turning of the tractor with the application of the friction clutch.

4. A two wheel tractor of the class described, the combination with a frame, a pair of driving wheels for supporting the frame, a draw bar fulcrumed to the rear of said frame, a pair of driving shafts, a gear and friction clutch on each of the respective driving shafts, a steering gear and hand wheel, connections therewith to swing the draw bar, a supporting rod, rocker shafts mounted thereon, a lever mounted on each rocker shaft for operating each clutch, means to limit the swing of the bar pivotally connected to the frame for connection to a vehicle to be drawn.

5. A two wheel tractor of the class described, the same comprising a frame, a pair of driving wheels, a motor and transmission for operating the machine, a pair of driving shafts, a differential gearing connecting the two shafts, a friction clutch connection between the respective driving shafts and driving wheels, means for operating the respective clutches to effect a stoppage of either wheel as desired, means for simultaneously operating both clutches to stop both wheels and a lever connected with said stopping means for disconnecting the engine and transmission, a draw bar hinged to the frame, means to limit the movement of the draw bar in either direction, a steering wheel, and connections with steering wheel and the draw bar for operating the latter.

Signed at Bridgeport in the county of Fairfield and State of Connecticut this 26th day of December A. D., 1912.

HENRY J. STEGEMAN.

Witnesses:
C. M. NEWMAN,
E. EARLE GARLICK.

Copies of this patent may be obtained for five cents each, by addressing the "Commissioner of Patents, Washington, D. C."